June 17, 1941.  R. H. TAYLOR  2,245,838
ELECTRODE WELDING-TIP PULLER
Filed Sept. 21, 1940
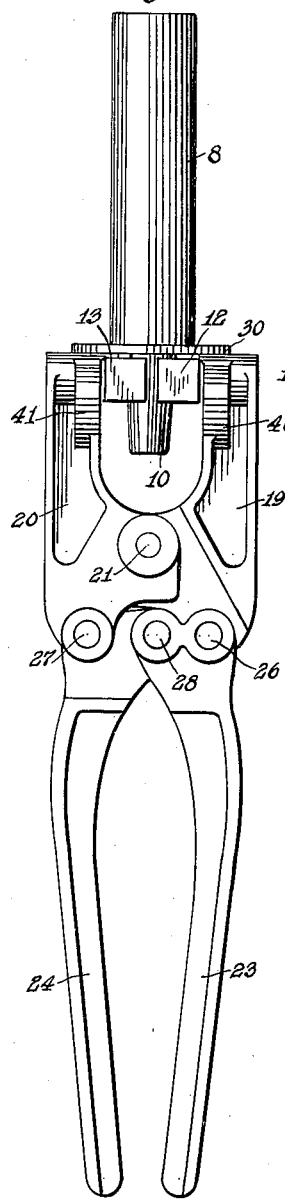
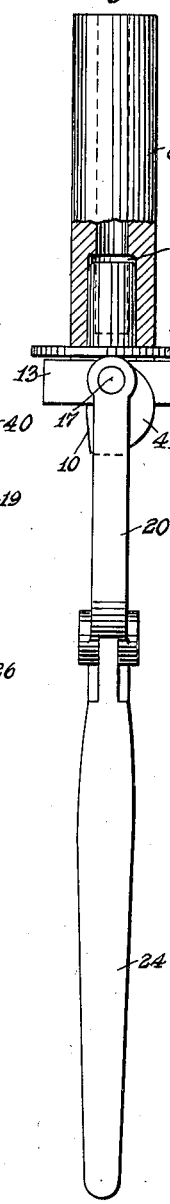
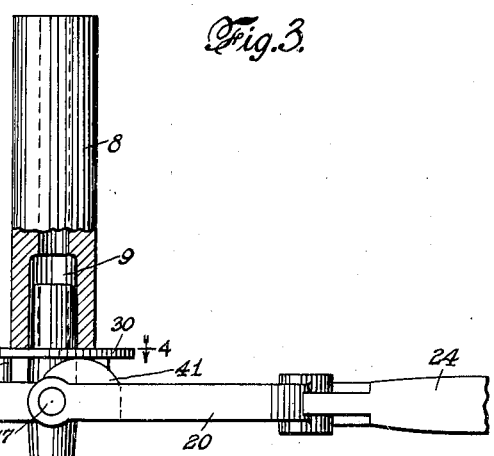
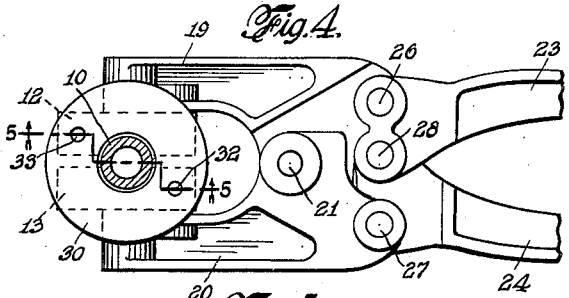
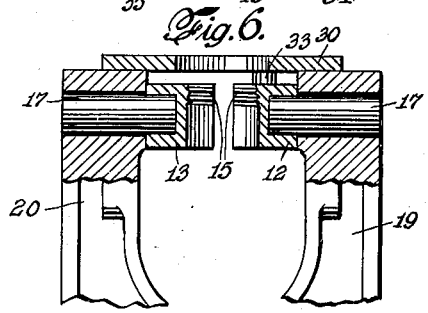
INVENTOR.
Richard Hall Taylor
BY Williams, Rich & Morse
ATTORNEYS.

Patented June 17, 1941

2,245,838

UNITED STATES PATENT OFFICE 2,245,838

ELECTRODE WELDING-TIP PULLER

Richard Hall Taylor, Greens Farms, Conn., assignor to Electroloy Company, Inc., New York, N. Y., a corporation of New Jersey Application September 21, 1940, Serial No. 357,827

5 Claims. (Cl. 254—22)

The present invention is an electrode welding-tip puller intended for removing a welding-tip from the holder in which it is secured by reason of the fact that the tapered end of the tip is seated in a similarly tapered hole in the holder.

After a welding-tip has been used in welding operations, the tip is of course securely seated in the holder; and the removal of the tip for renewal or for any other reason has been a more or less difficult operation. In practice, in removing welding tips from their holders, it has been customary either to twist them out with a Stillson wrench or heavy pliers, or to knock them out from the side with a cold chisel and hammer, or to remove them by other more or less violent methods. Any of these methods of removing a welding-tip from its holder is likely to and generally does distort the tapered hole in the holder, thereby making it necessary to re-machine the tapered hole in the holder or discard the holder and install a new one, because it is important that the welding-tip shall make good mechanical and electrical contact with the holder.

The general object of the present invention is to provide an electrode welding-tip puller which is capable of gripping the welding-tip and pulling it out of the holder with a straight line movement without twisting and without deforming the tapered hole in the holder in which the tapered end of the tip has been seated.

The invention will be understood from the following description of a preferred embodiment thereof, taken in connection with the accompanying drawing in which Fig. 1 is an elevation of the device in gripping engagement with a welding-tip, prior to the removal of the latter from its holder; Fig. 2 is an elevation of the device, welding-tip and holder looking from the left side of Fig. 1, the electrode holder being shown partly in section; Fig. 3 is an elevation, similar to Fig. 2 (but with portions of the handle of the device omitted) after the device has performed its electrode pulling operation; Fig. 4 is a plan view of the line 4—4 in Fig. 3; Fig. 5 is a sectional view on the line 5—5 in Fig. 4 on a somewhat larger scale, showing only the gripping jaws of the device and the disc secured thereto; and Fig. 6 is a fragmentary sectional elevation on the same scale as Fig. 5 and from the same point of observation as Fig. 1, showing the manner in which the gripping jaws are pivotally attached to the pinching means. The same parts will be hereinafter referred to by the same reference characters.

In Figs. 1, 2 and 3 of the drawing, there is shown an electrode holder 8 of usual form provided at its lower end with a tapered hole 9 adapted to receive the similarly tapered end of a welding-tip 10. As is customary the holder 8 may be made of copper and the welding-tip 10 of a suitable copper alloy.

In Figs. 1 and 2 the electrode welding-tip puller is shown in gripping contact with the welding-tip 10 preparatory to pulling it out of the holder 8. In Fig. 3 the puller is shown in actuated position after it has loosened the welding-tip in the holder 8.

The welding-tip puller is provided with gripping jaws 12 and 13 having inside surfaces which are slightly less than half a cylinder and have a radius slightly greater than half the diameter of a standard welding-tip, said cylindrical surfaces being provided with two or more gripping ridges 15 (Figs. 5 and 6) having a radius slightly less than one-half the diameter of the welding-tip. It will be understood that the gripping jaws 12 and 13 are adapted to be slipped over a welding-tip, and that when they are forced toward one another (by the means about to be described) the gripping ridges 15 tightly grip and even slightly cut into the surface of the welding-tip. The gripping jaws 12 and 13 are rotatably mounted in a manually operable pinching means of which a preferred form is shown in the drawing. The rotatable connection between the gripping jaws and the pinching means comprises studs 17 secured to and extending from the back of each of the gripping jaws 12 and 13 and into holes in the end of the pinching means which are substantially in alignment when the jaws are in the position in which they grip the welding-tip. As shown in the drawing, the pinching means includes pinching members 19 and 20 which are pivotally connected to one another by a pin 21 passing through them, and are provided at their outer ends with holes which receive the studs 17. The members 19 and 20 are relatively rocked on the pin 21 by handle members 23 and 24. As will be obvious from the drawing, the handle member 23 is pivotally connected to the member 19 by a pin 26 passing through both of these parts; handle member 24 is pivotally connected to the member 20 by a pin 27 passing through both of these parts; and the handle members 23 and 24 are pivotally connected to one another by a pin 28 which passes through both of these parts.

Figs. 1, 2, 3 and 4 show the device in the position in which the gripping of the welding-tip is effected; and it will be obvious that at this time the pivot pin 28 is in alignment, or just beyond alignment, with the pins 26 and 27; thereby providing a toggle effect which relieves the user from maintaining a tight grip upon the handle members 23 and 24 after the device has been applied to a welding-tip and moved to its gripping position.

A washer 30 having a hole therein of a diameter slightly larger than the diameter of the welding-tip, is supported by the gripping jaws, the means of attachment being best shown in Fig. 5 from which it will be apparent that each gripping jaw 12 and 13 is provided with a cylindrical cavity and a hole through each of which pass pins 32 and 33 the ends of which are tightly screwed into threaded holes at diametrically opposite points in the washer 30. The pins 32 and 33 are provided with heads 34 and 35, of somewhat less diameter than the diameter of the cavities through which the pins pass; and between each head 34 and 35 and the bottom of the corresponding cavity, springs 37 and 38 are provided. Thus the washer 30 is movably held quite close to the gripping jaws 12 and 13 and in engagement with the outer ends of the pinching members 19 and 20, as shown in Figs. 1, 2 and 6, when the device is applied to the end of a welding-tip and before it has been actuated to pull the tip out of the holder in the manner which will now be described.

After the device has been applied to a welding-tip 10 in a holder 8 as shown in Figs. 1 and 2, the manually operable pinching means (which includes the pivotally connected members 19 and 20 and handle members 23 and 24) is moved to the position shown in Fig. 3 which brings cams 40 and 41 formed on one side of the members 19 and 20 into engagement with the washer 30. This engagement of the cams 40 and 41 with the washer 30 results in forcing the gripping jaws 12 and 13 away from the washer 30 which remains stationary because it engages the bottom of the holder 8; and, because the jaws 12 and 13 are in tight gripping engagement with the welding-tip 10, the latter is pulled out of the holder 8 with a straight line movement. Thus the welding-tip 10 is removed from the holder 8 without deforming the tapered hole in the latter in which the tapered end of the tip has been seated. The tip 10, having thus been loosened from the holder 8, may be taken out of the holder stil gripped by the gripping jaws 12 and 13, after which the tip may be released by moving the handle members 23 and 24 away from one another.

It will be understood that the necessary relative movement between the washer 30 and the gripping jaws 12 and 13 during operation of the device is permitted by the clearances between the pins 32 and 33 and the cavities and holes in the jaws 12 and 13, and by the fact that the pins 32 and 33 are located at opposite ends of the jaws 12 and 13 and are connected to the washer 30 at diametrically opposite points, as will be clear from Fig. 4.

Of course, the device shown in the drawing may be modified without departing from the spirit of the invention as defined in the claims hereto appended.

What is claimed is:

1. An electrode welding-tip puller comprising manually operable pinching means, gripping jaws adapted to engage a welding-tip, means for pivotally supporting said gripping jaws upon said pinching means, a washer adapted to surround a welding-tip and lie against its holder, means for movably supporting said washer on the outside of said gripping jaws, and cams on said pinching means adapted to engage said washer and separate said washer and gripping jaws when said pinching means is swung about its pivotal connection with said gripping jaws.

2. An electrode welding-tip puller comprising manually operable pinching means, gripping jaws adapted to engage a welding-tip, a stud projecting from the back of each gripping jaw, the outer ends of said pinching means being provided with openings adapted to receive said studs whereby said gripping jaws are rotatably supported upon said pinching means, a washer adapted to surround a welding-tip and lie against its holder, means for movably supporting said washer on the outside of said gripping jaws, and cams on said pinching means adapted to engage said washer and separate said washer and gripping jaws when said pinching means is swung about its pivotal connection with said gripping jaws.

3. An electrode welding-tip puller comprising manually operable pinching means, gripping jaws adapted to engage a welding-tip, means for pivotally supporting said gripping jaws upon said pinching means, a washer adapted to surround a welding-tip and lie against its holder, a pin movably supported in each gripping jaw and connected to said washer, a spring cooperating with each of said pins and the gripping jaw in which said pin is supported, and cams on said pinching means adapted to engage said washer and separate said washer and gripping jaws when said pinching means is swung about its pivotal connection with said gripping jaws.

4. An electrode welding-tip puller comprising manually operable pinching means, gripping jaws adapted to engage a welding-tip, means for pivotally supporting said gripping jaws upon said pinching means, a washer adapted to surround a welding-tip and lie against its holder, a pin movably supported in each gripping jaw at opposite ends thereof respectively and connected to said washer at diametrically opposite points, a spring cooperating with each of said pins and the gripping jaw in which said pin is supported for resisting separation of said washer and gripping jaws, and cams on said pinching means adapted to engage said washer and separate said washer and gripping jaws when said pinching means is swung about its pivotal connection with said gripping jaws.

5. An electrode welding-tip puller comprising pivotally connected pinching members, handle members pivotally connected thereto and to one another, gripping jaws adapted to engage a welding-tip, means for pivotally supporting said gripping jaws upon the ends of said pinching members, a washer adapted to surround a welding-tip and lie against its holder, means for movably supporting said washer on the outside of said gripping jaws; and cams carried on said pinching means adapted to engage said washer and separate said washer and gripping jaws when said pinching means is swung about its pivotal connection with said gripping jaws.

RICHARD HALL TAYLOR.